Patented Nov. 17, 1931

1,831,932

UNITED STATES PATENT OFFICE

GEORGE H. STEVENS, OF NEWARK, NEW JERSEY

VULCANIZING RUBBER

No Drawing. Application filed April 12, 1928. Serial No. 269,606.

This invention relates to improvements in the use of organic, nitrogenous substances that assist in or accelerate the vulcanization of rubber, and has for its object the utilization of new products to this end.

This specification is a continuation in part of Ser. No. 651,968 filed July 16, 1923, relating to the use in vulcanization of mono- and tri- substituted guanidines, and the claims thereof are an award in an interference action involving that case. 651,968 in turn is a continuation in part of Ser. No. 399,979 filed July 30, 1920, that eventuated in part into Patent 1,465,743.

In Ser. No. 399,979, mention is made of the use of mono- phenyl guanidine ($C_7H_9N_3$) as a rubber accelerator.

Mono- phenyl guanidine has a melting point of 66° C., is quite hygroscopic, and is soluble in water. It decomposes readily at a temperature a little above its melting point and in so doing splits off ammonia, with carbomonophenylimide $C_7H_6N_2$ (or its equivalent phenyl cyanamide, or cyanalide), as the main decomposition product. This is liquid, or of very low melting point, but is readily polymerized to a product of much higher melting point and usually consisting of three molecules. The disassociation takes place as follows:

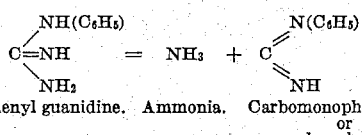

Mono- phenyl guanidine.   Ammonia.   Carbomonophenylimide
or
mono- phenyl cyanamide This carbomonophenylimide, or the polymerized carbomonophenylimide decomposition product of mono- phenyl guanidine, is a very reactive body, and especially so in the presence of the other decomposition product ammonia, and this activity continues so long as any ammonia is present.

This carbomonophenylimide decomposition product of mono- phenyl guanidine also combines readily with carbodiphenylimide to a polymerization product, either as one molecule of each to tri- phenyl dicarbiimide, or as two molecules of the former with one of the latter to tetra- phenyl melamine.

Carbomonophenylimide also combines readily with aniline to form di- phenyl guanidine, or with di- phenyl guanidine itself to form tri- phenyl biguanide.

Under vulcanization mono- phenyl guanidine breaks up into carbomonophenylimide and ammonia, and then a gradual polymerization of the carbomonophenylimide takes place, while the ammonia becomes gradually dissipated, leaving a product of much higher melting point and of more stability than the accelerator that was started with, and thereby an elimination of the accelerator has largely taken place.

In vulcanization then this would seem to indicate an early activity of the accelerator while the ammonia constitutent was being released, then a stage where the carbomonophenylimide constituent was slowly polymerizing to new products, and then an ultimate stage where the progressive reactions have accumulated higher melting bodies, or polymeric forms, in place of the lower melting accelerator started with.

These stages of reaction however, are not to be understood as distinctively separate, but are periods where the stated reactions would predominate. Such an accelerated vulcanization would appear then to promise less activity of the vulcanizing constituents of the rubber after vulcanization, than is found with accelerators that decompose into lower melting bodies that generally are of less stability.

That is, in the first case the vulcanized rubber has, "better aging qualities", or "stands aging better", than in the second case.

Some conflict of opinion persists as to what the immediate decomposition product of mono- phenyl guanidine is, but a substituted melamine is sure to constitute a substantial part of the ultimate end product, if the disassociation reaction is sufficiently prolonged.

Melamine is always a tri- molecular polymerization product of $CN_2H_2$ and the polymerizing together of three molecules of carbomonophenylimide (which is $CN_2H_2$ with a phenyl substitution) gives then a substituted melamine having three phenyl groups.

This tri-phenyl substituted melamine has a melting point of 185–228° C., is very stable at temperatures below its melting point, and appears to be very inactive so long as it is uncombined with any of its related bodies like ammonia or the substituted amines, and in thus substituting the accelerator started with, because of its high melting point, it greatly inhibits further vulcanization in the cold, that is, it allows the rubber to stand "aging better."

The formation of tri-phenyl melamine, or of tri-phenyl iso-melamine is stated in the literature to be due to the polymerizing together of three molecules of carbomonophenylimide, or of three molecules of phenyl cyanamide (Hofmann, Ber. 18, 3220; Rathke, Ber. 20, 1071; and Ber. 23, 1678). Probably there is no real difference in the two resultant compounds, or in their two components.

In the event that the presence of moisture in these reactions should cause a molecule of water to unite with the carbomonophenylimide and form the corresponding monophenyl urea, this body may to a substantial extent recombine again with the nascent ammonia, split off the water, and then follow the same normal path of decomposition as before.

Most of the reactions that take place with mono-phenyl guanidine are reversible, and the temperatures that cause the combinations may also cause in turn again their separation.

Should mono-phenyl guanidine or its disassociation product, during vulcanization, form combinations with the sulphur, or with any of the other usual compounding constituents, such combination would appear to be largely a catalytic reaction step, and any rejuvenation of any of these initial products, or of any of their decomposition products later, would then permit the normal reactions to continue.

That such catalytic reactions do so continue has authoritative support, as well as being observable in general practice (Ostromuislensky, Jour. Russ. Phyl. Chem. Soc. 47, 1892, 8, 1915).

The foregoing reactions relate to monophenyl guanidine or to mono-phenyl substituted guanidine, and to its decomposition products.

However, much the same series of reactions seem to also take place with the mono-tolyl substituted guanidines, mono-xylil substituted guanidines, and with all the mono-aryl substituted guanidines that are homologous to, but of a higher homologue than monophenyl guanidine.

While aniline enters into the production of mono-phenyl guanidine, in a like manner the homologues of aniline, such as toluidine, xylidine, and the higher primary aryl substituted monamines that exist only in isomeric ortho-, para-, and meta-forms, also enter into the production of corresponding tolyl, xylil, and higher homologous mono-aryl substituted guanidines.

Aniline and these isomeric homologues of aniline, in their chemical activity however, are not necessarily confined to reactions within their own group, for if they be in the presence of a different group they will cause the formation of products containing both of such homologous groups, and a mono-substituted guanidine accelerator comprising different aromatic groups would then upon decomposing, result in a substituted melamine also containing different aromatic groups.

Isomeric forms of mono-aryl substituted guanidines in combination are however more generally used, and as a mixture, or in the form of a "solid solution", they accelerate vulcanization then at their maximum efficiency.

In Ser. No. 399,979 has been explained the use of organic nitrogenous accelerators in such "solid solution" form, whereby the melting point of the components has been thus modified or changed to a different and common melting point for both.

In my investigation of that series of compounds of which the several examples have been mentioned, I have found that such monosubstituted guanidines, or accelerators consisting of mono-substituted guanidines that have an aromatic group, or mixtures of the decomposition products of such mono-substituted guanidine accelerators, do prove of unusual value in accelerating rubber vulcanization.

Mono-phenyl guanidine is readily made by desulphurizing mono-penyl thiourea in the presence of ammonia (Ber. 1879, 12, 1602). Mono-phenyl thiourea results from the union of phenyl mustard oil and ammonia.

Likewise desulphurizing phenyl mustard oil in the presence of ammonia gives monophenyl guanidine.

Mono-phenyl guanidine is also made by combining carbomonophenylimide and ammonia (Beilstein 1883, II, 920), it also results from the union of tri-phenyl melamine and ammonia.

Another way of producing it is from cyanamide (carbodiimide) and aniline hydrochloride (Am. Chem. Jnl. 1901, 26, 221; Ber. 1904, 37, 1681; Richter, 1922, II, 104), the acid salt is then neutralized for recovering the base.

Mono-phenyl guanidine is also a decomposition product of phenyl biguanide (Monatsch. 1891, 12, 17).

A desulphurization of mono-phenyl thiourea gives the same carbomonophenylimide as does the decomposition of mono-phenyl guanidine.

The mono-tolyl, mono-xylil, and other homologous mono-substituted guanidines having aromatic groups, can all be prepared from their corresponding aryl substituted monamines in the same manner that monophenyl guanidine is prepared.

Mono- aryl substituted guanidines often occur in combination, and the several isomeric forms of any one mono- aryl substituted guanidine are generally in combination. This may be in the simple form of mixtures, or as the neutralized "solid solution" precipitate of their combined salt solutions in manufacture, or they may be in combination with their by-products, or with their de-composition products, due to the general processes of manufacture.

The use of any of these, or the introduction into a vulcanization of carbomonophenylimide, or of a carbomono- substituted imid homologous to carbomonophenylimide (as easy to obtain or to make as these guanidines), either with ammonia, or in the presence of any products that will supply the ammonia, and in a manner to effect a similar reaction and acceleration activity, or that will result in a tri- substituted melamine as the ultimate end product, is intended to be included within the scope of this specification.

The following is a representative rubber mix using mono- phenyl guanidine as an accelerator:

82 % smoked sheets.
5 % zinc oxide.
7 % barytes.
5½ % sulphur.
0½ % mono- phenyl guanidine.

100 %

The quantities are by weight. The cure is the heat of 40 lbs. steam pressure for from 25 to 35 minutes.

The above proportion of accelerator may be changed considerably to meet varying conditions of vulcanization.

The polymerization product tri- phenyl melamine that ultimately results from the decomposition of mono- phenyl guanidine, upon being heated with ammonia, or with an ammonia generating compound, will again form mono- phenyl guanidine.

If such a combination be effected in the rubber during vulcanization, nascent monophenyl guanidine results, and this nascent product is of greater activity than the regular mono- phenyl guanidine, but after performing its function as an accelerator the ammonia therefrom quickly dissipates itself and tri- phenyl melamine will ultimately again result.

The tri- substituted melamines, mono- substituted guanidines, and mono- substituted carbodiimides containing tolyl, xylil, and the higher groups, homologous to the phenyl group, all show much the same reaction behavior under the same vulcanizing temperatures and conditions.

In my early disclosures of the use of these derivatives of aryl substituted carbodiimide, that result from their reactions with ammonia, I particularly set forth the fact that other substituted guanidines resulting from substituted carbodiimides homologous to these phenyl and tolyl substituted bodies also prove to be efficient accelerators of rubber vulcanization, and the following is what standard chemical authorities have to say as to what is meant by such "homologous products."

Bernthsen & Sudborough, Organic Chemistry, 1912 ed. state:

A product is homologous to another product, when any homologous series comprises both, and such a homologous series is one in which the several members arrange themselves in a numerical sequence as to the number of carbon atoms contained in the molecule.

Any particular member of a homologous series differs from the preceding member, and from the succeeding member, always by a definite amount, namely $CH_2$.

Or expressed in other words, any member of the series is derived from the preceding member of the series, by the introduction of a methyl ($CH_3$) group for an atom of hydrogen in the preceding member.

The homologous benzene series from which are derived the aryl substituted amines consists of:

Benzene $C_6H_6$
Toluene $C_7H_8$    Methyl benzene.
Xylene $C_8H_{10}$    Di-methyl benzene.
Cumene $C_9H_{12}$    Iso-propyl benzene.
Cymene $C_{10}H_{14}$    Methyl iso-propyl benzene.

Upon introducing the amido ($NH_2$) group for a hydrogen in each of these benzenes, the aryl substituted monamines are formed, and these furnish then the substituting aromatic radicals or groups that appear in the resultant substituted guanidines. These aryl substituted monamines or substituted amido benzenes are:

Aniline    $NH_2(C_6H_5)$     Amido benzene.
Toluidine  $NH_2(C_7H_7)$     Amido methyl benzene.
Xylidine   $NH_2(C_8H_9)$     Amido di-methyl benzene.
Cumidine   $NH_2(C_9H_{11})$  Amido iso-propyl benzene.
Cymidine   $NH_2(C_{10}H_{13})$  Amido methyl iso-propyl benzene.

Upon the introduction of the $NH_2$ group for a hydrogen in the respective benzenes, all but the amido benzene (aniline), exist solely in ortho-, para-, or meta- isomeric forms.

A mono- substituted guanidine homologous to a mono- phenyl substituted guanidine is then, a mono- substituted guanidine containing an aromatic group, the radical of which contains the phenyl group in which one or more of its hydrogens have been substituted by methyl $CH_3$ groups, and the empirical formula of which group is some multiple addition of $CH_2$ to the phenyl group.

A mono- substituted guanidine then containing an aromatic radical or group would be a mono- substituted guanidine containing some specific member of the foregoing homologous series of aromatic groups.

My invention then consists in making use of mono- phenyl substituted guanidine, or of mono-aryl substituted guanidines homologous to mono- phenyl substituted guanidine, or of a mono- substituted guanidine accelerator containing an aromatic group, as an aid to rubber vulcanization.

It is to be understood that I do not expect to be limited to the particular ingredients, components, and proportions given in this specification, or to merely such examples as have been cited by me, in practicing my invention, it being readily understood by those well versed in the art that said ingredients, components, and proportions, may be varied within comparatively wide limits without departing from the principles and purposes of my invention as herein set forth.

It is to be further understood that my invention is not to be construed as dependent on the accuracy or soundness of any of the theories herein expressed, or on the correctness of any structural formulas used to designate the products.

Having now described my invention, and having shown in what manner the same may be utilized, what I claim as new and desire to secure by Letters Patent is:

1. A process of vulcanizing rubber or similar material which comprises combining with the rubber a vulcanizing agent and mono-phenyl guanidine and vulcanizing the rubber.

2. A vulcanized rubber derived from rubber or similar material combined with a vulcanizing agent and mono- phenyl guanidine.

3. A process of vulcanizing rubber or similar material which comprises combining with the rubber a vulcanizing agent and an accelerator represented by the general formula

wherein R is an aromatic group, and vulcanizing the rubber.

4. A vulcanized rubber derived from rubber or similar material combined with a vulcanizing agent and an accelerator represented by the general formula

wherein R is an aromatic group.

GEORGE H. STEVENS.